US 10,286,910 B2

United States Patent
Nagatsuka et al.

(10) Patent No.: US 10,286,910 B2
(45) Date of Patent: May 14, 2019

(54) VEHICLE RUNNING CONTROL APPARATUS

(71) Applicant: Hitachi Automotive Systems, Ltd., Hitachinaka-shi, Ibaraki (JP)

(72) Inventors: Keiichiro Nagatsuka, Hitachinaka (JP); Makoto Yamakado, Tokyo (JP); Mitsuhide Sasaki, Hitachinaka (JP); Mikio Ueyama, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/025,761

(22) PCT Filed: Jun. 13, 2014

(86) PCT No.: PCT/JP2014/065674
§ 371 (c)(1),
(2) Date: Mar. 29, 2016

(87) PCT Pub. No.: WO2015/045502
PCT Pub. Date: Apr. 2, 2015

(65) Prior Publication Data
US 2016/0229401 A1    Aug. 11, 2016

(30) Foreign Application Priority Data
Sep. 30, 2013    (JP) .................... 2013-202964

(51) Int. Cl.
*B60W 10/04*    (2006.01)
*B60W 30/14*    (2006.01)
(Continued)

(52) U.S. Cl.
CPC ............ *B60W 30/14* (2013.01); *B60W 10/04* (2013.01); *B60W 10/184* (2013.01);
(Continued)

(58) Field of Classification Search
USPC ........................................... 701/96
See application file for complete search history.

(56) References Cited

U.S. PATENT DOCUMENTS 5,256,944 A  * 10/1993  Tobise .................. H02P 7/2855
                                                             318/7
5,867,803 A  *  2/1999  Kim ...................... B60K 28/16
                                                            123/333
(Continued)

FOREIGN PATENT DOCUMENTS

EP        2 492 160 A1     8/2012
JP       2008-285066 A    11/2008
(Continued)

OTHER PUBLICATIONS

English Machine Translation from JPO of Japanese Patent Application Pub, No. JP,2010-076584 A to Saito et al. (https://www4.j-platpat.inpit.go.jp/cgi-bin/tran_web_cgi_ejje?u=http://www4.j-platpat.inpit.go.jp/eng/translation/201705050028267382458469066059376 4AC188DD941FBCBA41F581EAEFCFA7C2C).*
(Continued)

*Primary Examiner* — Jean Paul Cass
(74) *Attorney, Agent, or Firm* — Crowell & Moring LLP (57) ABSTRACT

Provided is a vehicle running control apparatus capable of controlling a vehicle comfortably while inhibiting an uncomfortable feeling of a driver in consideration of dimensions of longitudinal acceleration requirements for the vehicle. This vehicle running control apparatus includes: a first control command value calculation unit configured to calculate a first control command value that controls vehicle longitudinal acceleration; a second control command value calculation unit configured to calculate a second control command value that controls longitudinal acceleration according to a lateral jerk that acts on the vehicle; a correction determination processing unit configured to deter-
(Continued)

mine whether to make correction based on the first control command value and the second control command value; and a correction processing unit configured, when the correction determination processing unit determines that correction is needed, to correct the first control command value based on the second control command value.

9 Claims, 9 Drawing Sheets

(51) Int. Cl.
B60W 30/16 (2012.01)
B60W 30/18 (2012.01)
B60W 10/184 (2012.01)

(52) U.S. Cl.
CPC .......... *B60W 30/143* (2013.01); *B60W 30/16* (2013.01); *B60W 30/18145* (2013.01); *B60W 2520/105* (2013.01); *B60W 2520/125* (2013.01); *B60W 2540/10* (2013.01); *B60W 2540/12* (2013.01); *B60W 2720/106* (2013.01)

(56) References Cited

U.S. PATENT DOCUMENTS

| | | | | |
|---|---|---|---|---|
| 6,032,097 | A * | 2/2000 | Iihoshi | G08G 1/22 701/96 |
| 7,102,496 | B1 * | 9/2006 | Ernst, Jr. | G08G 1/0967 25 180/167 |
| 7,124,027 | B1 * | 10/2006 | Ernst, Jr. | B60W 30/09 701/301 |
| 7,433,772 | B2 * | 10/2008 | Isaji | B60T 7/22 340/435 |
| 8,378,803 | B1 * | 2/2013 | Keiser | B60T 7/12 340/425.5 |
| 8,483,928 | B2 * | 7/2013 | Shida | B60W 30/165 701/96 |
| 8,510,012 | B2 * | 8/2013 | Amato | B60K 31/0058 701/96 |
| 8,793,035 | B2 * | 7/2014 | Yu | B60W 40/13 280/432 |
| 9,114,683 | B2 * | 8/2015 | Kikuchi | B60G 17/015 |
| 9,296,374 | B2 * | 3/2016 | Yamakado | B60L 3/102 |
| 9,331,773 | B2 * | 5/2016 | Bordetsky | B64D 17/00 |
| 9,352,747 | B2 * | 5/2016 | Nagatsuka | G01S 19/13 |
| 9,454,508 | B2 * | 9/2016 | Yu | B60W 40/076 |
| 9,623,850 | B2 * | 4/2017 | Yamakado | B60L 3/102 |
| 10,042,815 | B2 * | 8/2018 | Yu | B60W 40/13 |
| 2001/0035049 | A1 * | 11/2001 | Balch | B60L 3/10 73/488 |
| 2005/0096827 | A1 * | 5/2005 | Sadano | B60T 7/22 701/70 |
| 2009/0132125 | A1 * | 5/2009 | Yonezawa | B60W 30/12 701/41 |
| 2010/0114431 | A1 * | 5/2010 | Switkes | B60T 8/17557 701/41 |
| 2011/0022251 | A1 * | 1/2011 | Puig | G05D 1/0083 701/16 |
| 2011/0253101 | A1 * | 10/2011 | Mathews | F02P 5/045 123/406.27 |
| 2012/0109421 | A1 * | 5/2012 | Scarola | G08G 1/163 701/2 |
| 2012/0150411 | A1 | 6/2012 | Oosawa et al. | |
| 2012/0323445 | A1 | 12/2012 | Yamakado et al. | |
| 2013/0009013 | A1 * | 1/2013 | Bourakov | B64D 17/00 244/186 |
| 2013/0116861 | A1 * | 5/2013 | Nemoto | B60W 30/16 701/2 |
| 2013/0191002 | A1 | 7/2013 | Minase et al. | |
| 2014/0180554 | A1 | 6/2014 | Takahashi et al. | |
| 2016/0357187 | A1 * | 12/2016 | Ansari | G01S 15/931 |
| 2016/0357188 | A1 * | 12/2016 | Ansari | G05D 1/0212 |
| 2016/0357262 | A1 * | 12/2016 | Ansari | G06F 3/017 |
| 2016/0358477 | A1 * | 12/2016 | Ansari | G08G 1/167 |

FOREIGN PATENT DOCUMENTS

| | | |
|---|---|---|
| JP | 2010-76584 A | 4/2010 |
| JP | 2012-126148 A | 7/2012 |
| WO | WO 2012/153367 A1 | 11/2012 |

OTHER PUBLICATIONS

International Search Report (PCT/ISA/210) issued in PCT Application No. PCT/JP2014/065674 dated Sep. 16, 2014 with English-language translation (three (3) pages).

Japanese-language Written Opinion (PCT/ISA/237) issued in PCT Application No. PCT/JP2014/065674 dated Sep. 16, 2014 (five (5) pages).

Extended European Search Report issued in counterpart European Application No. 14848925.5 dated Jun. 29, 2017 (7 pages).

English translation of Chinese-language Office Action issued in counterpart Chinese Application No. 201480053824.3 dated Jul. 21, 2017 (6 pages).

\* cited by examiner

VEHICLE RUNNING CONTROL APPARATUS

TECHNICAL FIELD

The present invention relates to a vehicle running control apparatus for controlling longitudinal acceleration of a vehicle.

BACKGROUND ART

The most basic vehicle running control apparatuses for controlling longitudinal acceleration of a vehicle include an apparatus for controlling longitudinal acceleration (acceleration side) of the vehicle in response to driver accelerator operation and for controlling longitudinal acceleration (deceleration side) of the vehicle in response to driver brake operation.

In addition to such an apparatus, the following running control apparatuses with additional functions for reduction in driving loads of a driver and prevention of accidents are also generally known.

That is, one of the running control apparatuses and running control algorithms is cruise control (hereinafter referred to as CC), which is an apparatus for controlling longitudinal acceleration to maintain a preset speed even if a driver does not perform accelerator operation. Another one of the running control apparatuses and running control algorithms is adaptive cruise control (hereinafter referred to as ACC). ACC is an apparatus configured to operate as a function equivalent to the aforementioned CC when there are no vehicles running ahead of a self-vehicle or in a control range, and is an apparatus configured, when a vehicle running ahead of the self-vehicle is in the control range, to control longitudinal acceleration so as to maintain a distance from this vehicle at an inter-vehicle distance or inter-vehicle time previously set by a driver.

Furthermore, in addition to these apparatuses, there is a running control apparatus for controlling a vehicle safely and comfortably like a skilled driver by controlling longitudinal acceleration in accordance with a lateral jerk that occurs in a vehicle resulting from driver operation. PTL 1 discloses this type of control apparatus. The running control algorithm incorporated in this running control apparatus is generally called G-Vectoring control.

Note that a technique that combines the plurality of running control apparatuses described above to make one system by combining the plurality of basic running control algorithms is also known.

Such a running control apparatus, which is an apparatus for controlling a vehicle safely, is also an apparatus for assisting driving by a driver to control the vehicle comfortably. In particular, from a viewpoint of an apparatus for comfortable control, it is important to perform control without giving an uncomfortable feeling to a driver.

As a running control apparatus for obtaining a control effect while correcting the control so as not to give an uncomfortable feeling to a driver, PTL 2 discloses an acceleration-and-deceleration control apparatus configured to control an acceleration-and-deceleration speed of a self-vehicle, to correct longitudinal acceleration of the self-vehicle based on a lateral jerk of the self-vehicle, and to permit or prohibit correction of a longitudinal acceleration-and-deceleration speed of the self-vehicle based on predetermined conditions.

CITATION LIST

Patent Literatures

PTL 1: Japanese Patent Application Laid-Open No. 2008-285066

PTL 2: Japanese Patent Application Laid-Open No. 2010-76584

SUMMARY OF INVENTION

Technical Problem

The acceleration-and-deceleration control apparatus disclosed in PTL 2 may cause the self-vehicle to behave in accordance with acceleration-and-deceleration intention of the driver more, and may reduce the uncomfortable feeling of the driver resulting from correction control of the acceleration-deceleration speed.

That is, this acceleration-and-deceleration control apparatus is a technique for correcting strength of control in consideration of the "acceleration-and-deceleration intention of the driver" by driver accelerator operation. However, the uncomfortable feeling lingers by application of brake control during the driver accelerator operation depending on settings of an amount of correction. Also, it is hard to say that sufficient consideration is given to a point that the driver accelerator operation disables control, so that no effect is obtained. An object of the present invention is to provide a vehicle running control apparatus capable of comfortably controlling the vehicle while inhibiting the uncomfortable feeling of the driver in consideration of dimensions of longitudinal acceleration requirements for the vehicle.

Solution to Problem

To achieve the above object, a vehicle running control apparatus of the present invention includes: a first control command value calculation unit configured to calculate a first control command value that controls vehicle longitudinal acceleration; a second control command value calculation unit configured to calculate a second control command value that controls longitudinal acceleration according to a lateral jerk that acts on the vehicle; a correction determination processing unit configured to determine whether to make correction based on the first control command value and the second control command value; and a correction processing unit configured, when the correction determination processing unit determines that correction is needed, to correct the first control command value based on the second control command value.

Advantageous Effects of Invention

The present invention may provide the vehicle running control apparatus capable of comfortably controlling the vehicle while inhibiting the uncomfortable feeling of the driver in consideration of dimensions of longitudinal acceleration requirements for the vehicle.

DESCRIPTION OF EMBODIMENTS

The following describes an exemplary embodiment of a vehicle running control apparatus according to the present invention with reference to the drawings.

<Configuration of the Running Control Apparatus>

Figure 1:
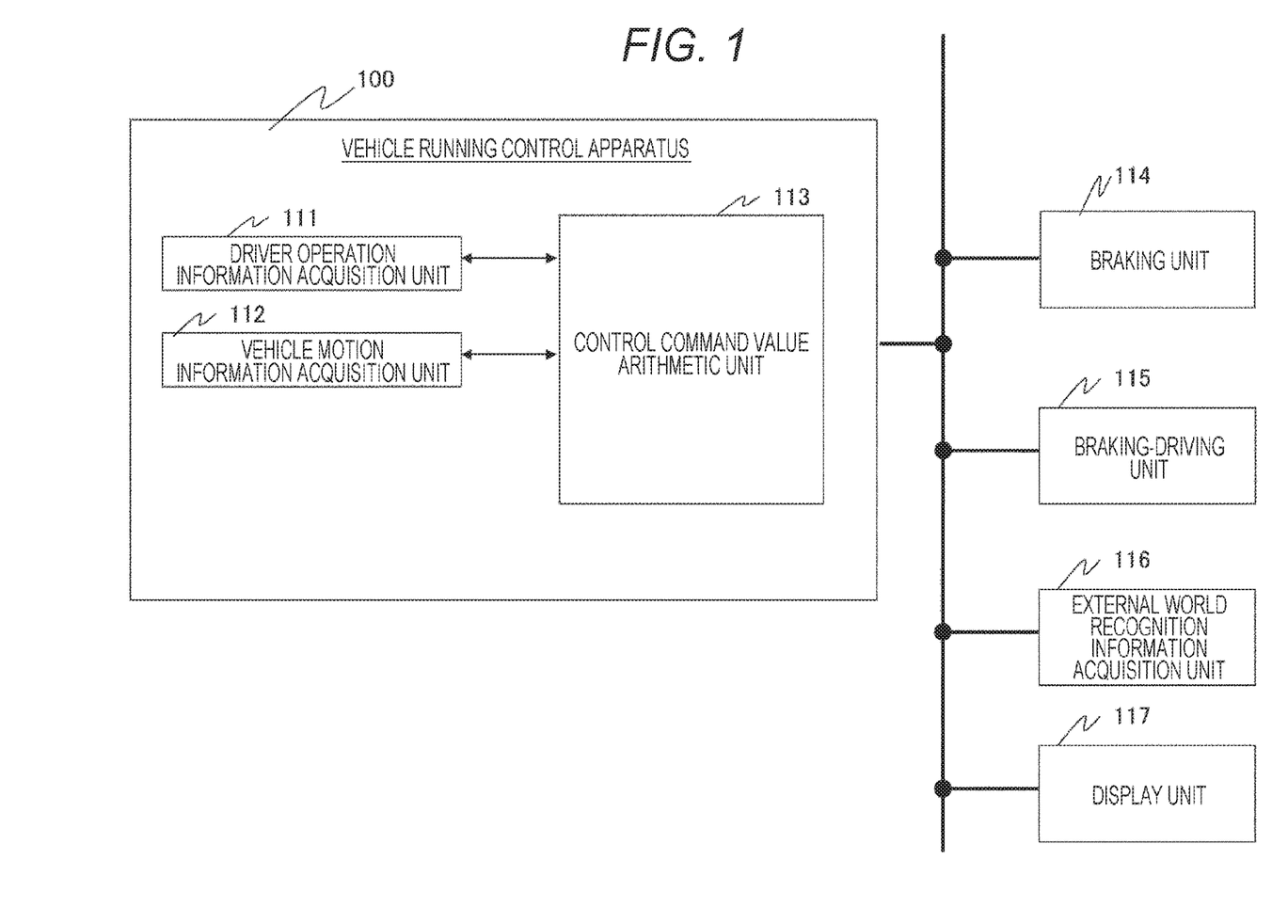
FIG. 1 is a block diagram illustrating an exemplary embodiment of a vehicle running control apparatus according to the present invention.

FIG. 1 is a block diagram of the vehicle running control apparatus according to the present exemplary embodiment. In this diagram, a running control apparatus 100 includes a driver operation information acquisition unit 111, a vehicle motion information acquisition unit 112, and a control command value arithmetic unit 113.

In accordance with a control command value calculated by the running control apparatus 100, a braking unit 114 executes braking of a vehicle, and a braking-driving unit 115 executes braking or driving of a vehicle.

An external world recognition feeling acquisition unit 116 is an external world recognition sensor, and has a function to detect a distance, a relative speed, and an angle with respect to vehicles, persons, articles, and the like that exist in the surroundings of an unillustrated self-vehicle, and to transmit results of the detection to the control command value arithmetic unit 113. Specific examples of the external world recognition sensor include a stereoscopic camera, a monocular camera, a millimeter-wave radar, and a laser radar.

A display unit 117 displays a control state and the like in response to a request on a display or a car navigation system that displays information for an unillustrated driver. In particular, in order to inform the driver of a situation where energy use efficiency is improving because a method of the present invention inhibits unnecessary brake control, the display unit 117 has a function to turn on or blink the display.

The driver operation information acquisition unit 111 has a function to collect driver operation information, such as an accelerator operation amount, a brake operation amount, a gear-shifting operation, and a steering angle, and to convey the driver operation information to the control command value arithmetic unit 113.

The vehicle motion information acquisition unit 112 has a function to collect vehicle behavioral information, such as a self-vehicle speed, a yaw rate, longitudinal acceleration, and lateral acceleration, and to convey the vehicle behavioral information to the control command value arithmetic unit 113.

Here, as information to be transmitted to the control command value arithmetic unit 113 from the driver operation information acquisition unit 111, the vehicle motion information acquisition unit 112, and the external world recognition information acquisition unit 116, it is sufficient that information necessary for a running control algorithm mounted on the control command value arithmetic unit 113 may be collected. It is also possible to add a component such as a sensor as needed.

The control command value arithmetic unit 113 includes a Read Only Memory (ROM), which is a storage unit for storing the running control algorithm and a parameter previously determined by experiment and the like, a Central Processing Unit (CPU), which is a processing unit for executing various arithmetic processes, a Random Access Memory (RAM), which is a storage unit for storing results of the arithmetic processes, and the like. Note that a configuration of the running control algorithm mounted on the control command value arithmetic unit 113 will be described below with reference to FIG. 2.

The braking unit 114 has a function to brake a vehicle in accordance with the control command value (braking command value) over the vehicle calculated by the control command value arithmetic unit 113. For example, a pump that discharges a high-pressure brake fluid, and a mechanism such as a magnetic valve for supplying the brake fluid to a wheel cylinder of each wheel while adjusting pressure of the brake fluid are preferred.

The braking-driving unit 115 has a function to brake and drive a vehicle in accordance with the control command value over the vehicle calculated by the control command value arithmetic unit 113. Specifically, an engine system, an electric motor system, and the like capable of varying driving force of a vehicle in accordance with the driving command value are appropriate.

In addition, when an electric motor system is used as the braking-driving unit 115, it is possible to perform braking by sharing part of braking capability required for the braking unit 114 with regenerative braking.

While the present exemplary embodiment describes the running control apparatus 100, the braking unit 114, and the braking-driving unit 115 as separate blocks, it is also possible, for example, to combine the vehicle running control apparatus 100 and the braking unit 114 to make one system, to combine the vehicle running control apparatus 100 and the braking-driving unit 115 to make one system, or to combine all of the vehicle running control apparatus 100, the braking unit 114, and the braking-driving unit 115 to make one system.

In addition, in the present exemplary embodiment, for information transmission between the control command value arithmetic unit 113, and the driver operation information acquisition unit 111 and the vehicle motion information acquisition unit 112, serial communications and physical quantities are changed to voltage signals and read by an Analog Digital Converter (ADC) and the like. However, necessary information may be received from unillustrated other external systems by using Controller Area Network (CAN) commonly used as a vehicle-mounted network.

In addition, CAN is used for information transmission between the control command value arithmetic unit 113, and the braking unit 114 and the braking-driving unit 115.

<Internal Configuration of the Control Command Value Arithmetic Unit>

Figure 2:
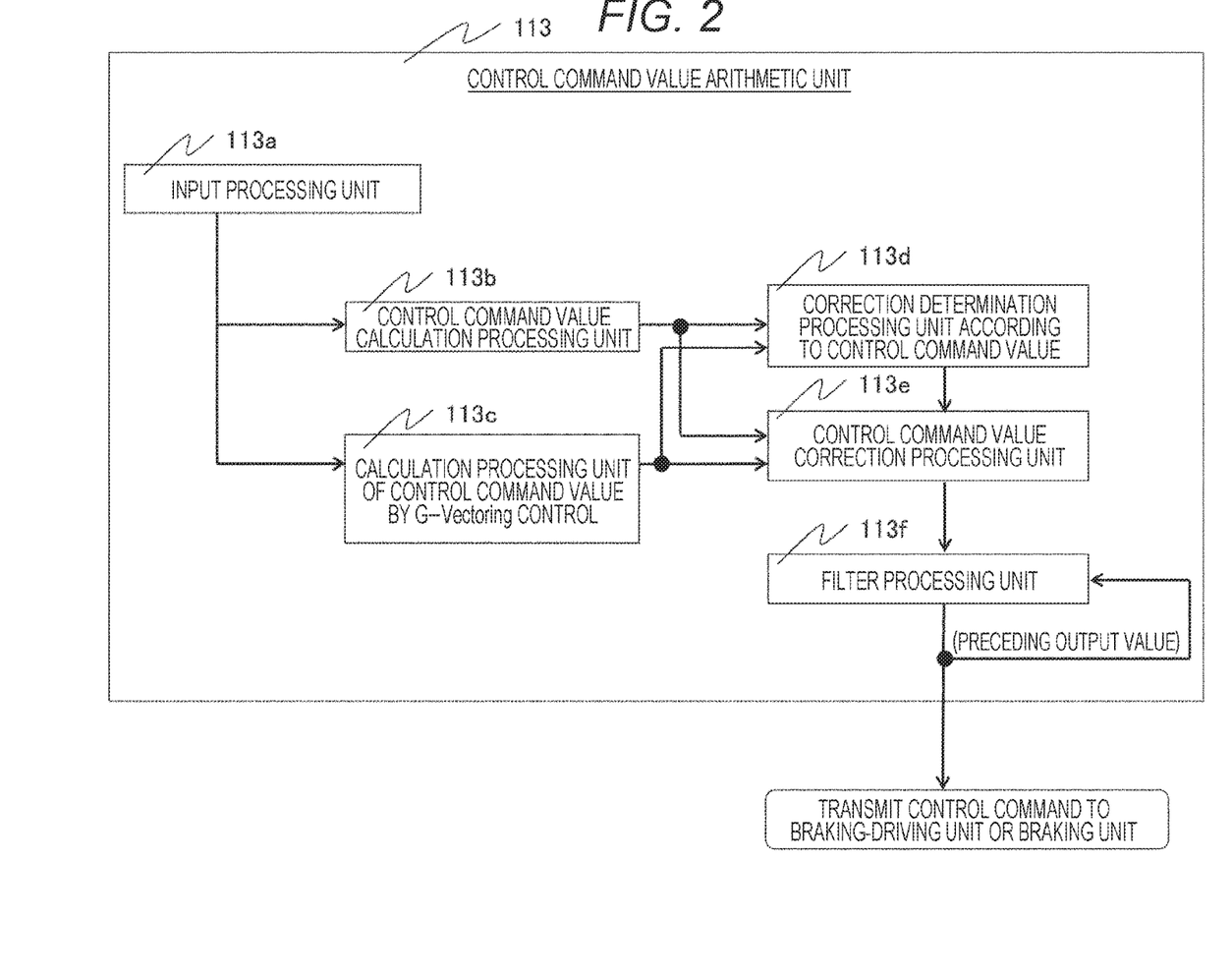
FIG. 2 is a block diagram illustrating an exemplary embodiment of a control command value arithmetic unit of the present invention.

Next, a configuration of the running control algorithm mounted on the control command value arithmetic unit 113 will be described. FIG. 2 is a software block configuration diagram of the control command value arithmetic unit 113.

In this diagram, the control command value arithmetic unit 113 includes an input processing unit 113a, a control command value calculation processing unit 113b, which is a first control command value arithmetic unit, and a calculation processing unit of control command value by G-Vectoring control 113c, which is a second control command value arithmetic unit. Here, in addition to processing for calculating the control command value in accordance with driver accelerator operation and brake operation, the control command value calculation unit 113b may be configured through combination of arbitrary running control algorithms, such as ACC and CC, to allow calculation of the control command value. The configuration in the present exemplary embodiment will be described later.

The control command value arithmetic unit 113 further includes a correction determination processing unit 113d for determining whether to perform final correction of the control command value in accordance with the control command value calculated by the control command value calculation processing unit 113b, and a control command value correction processing unit 113e, which is a correction processing unit for performing correction of the control command value in accordance with a result of the correction determination.

Then, a filter processing unit 113f calculates a final control command value that undergoes Low Pass Filter (LPF) processing with a value that is output last time and a value that is output from the control command value correction processing unit 113e, and transmits the final control command value to the braking-driving unit 115 and the braking unit 114.

<Processing Flow of the Control Command Value Arithmetic Unit>

Figure 3:
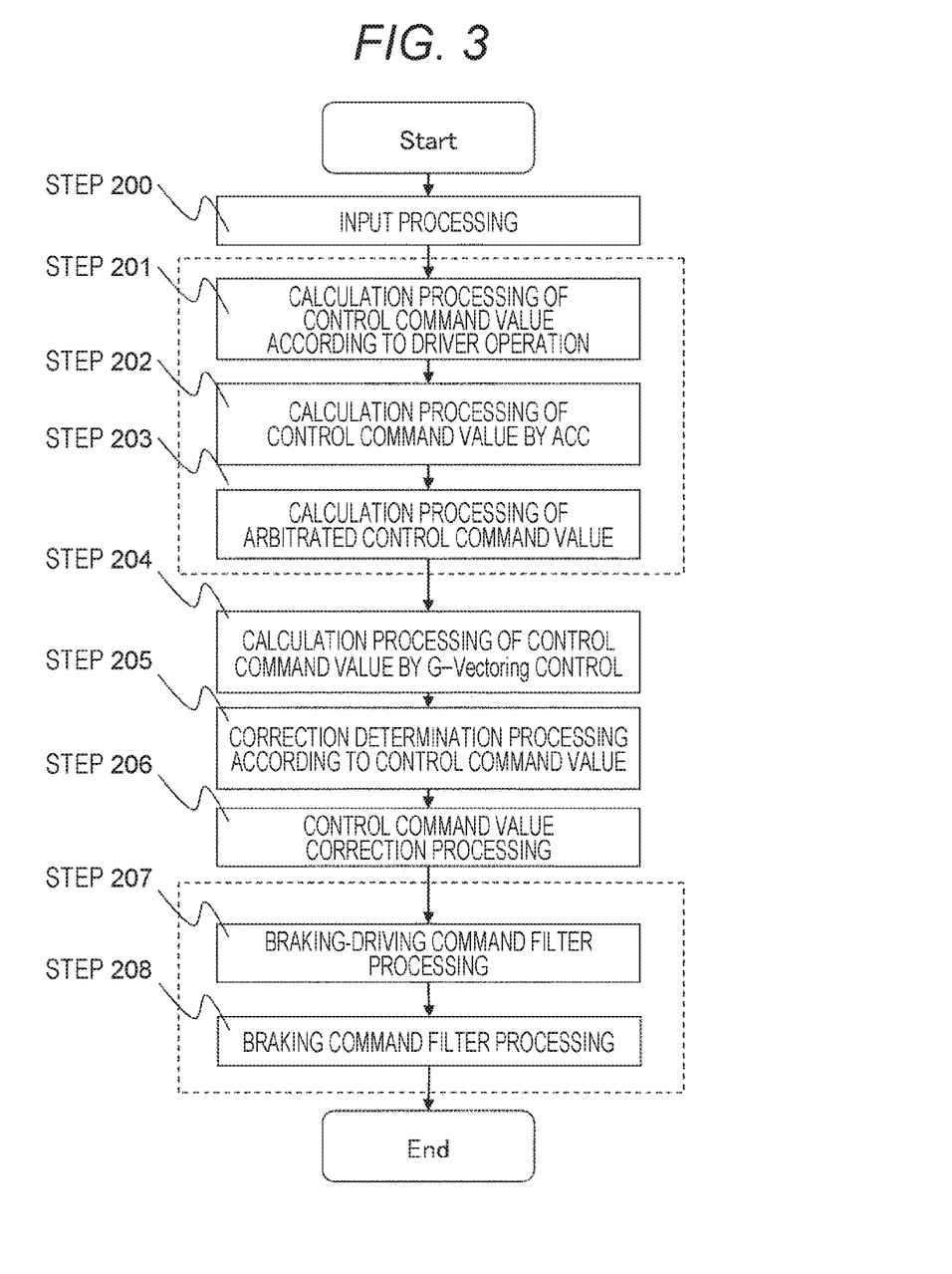
FIG. 3 is a diagram illustrating an example of a processing flow of the control command value arithmetic unit of the present invention.

Next, a specific processing flow in the control command value arithmetic unit 113 that constitutes the vehicle running control apparatus 100 according to the present exemplary embodiment will be described with reference to FIG. 3. FIG. 3 is a flowchart of a routine to be executed by the control command value arithmetic unit 113. The illustrated routine is repeated at predetermined time intervals.

The following describes a case where the running control algorithm mounted on the control command value arithmetic unit 113 is calculation processing of the control command value according to driver operation, ACC, and G-Vectoring control. As a specific configuration, the following describes a case where the calculation processing of the control command value according to driver operation and ACC are disposed in the control command value calculation processing unit 113b, and where the G-Vectoring control is disposed in the calculation processing unit of control command value by G-Vectoring control 113c.

When the routine is started, input processing of step 200 is executed first, and information measured by the driver operation information acquisition unit 111 and the vehicle motion information acquisition unit 112 is converted into a data format to be used in subsequent steps. In addition, information on a leading vehicle received from the external world recognition information acquisition unit 116 is converted into the data format to be used in subsequent steps. Specifically, calculation of new physical quantities and the like are performed through physical unit conversion processing of input signals, time differential processing, and calculation by known physical Mathematical Formulas.

Next, calculation processing (first calculation processing) of the control command value (first control command value) according to driver operation (Gx_Drv) of step 201 is executed. The control command value on an acceleration side according to the driver accelerator operation amount or the control command value on a deceleration side according to the driver brake operation amount is calculated. That is, requirement acceleration according to the driver accelerator operation is calculated, and the control command value (Gx_Drv) is output. Here, when the driver makes the brake operation and accelerator operation simultaneously, in order to give priority to safety, the control command value is calculated by giving priority to the driver brake operation.

In addition, this flowchart illustrates a case where a unit of each control command value calculated in this step or later is represented with gravitational acceleration "G". A positive value represents an acceleration command value and a negative value represents a deceleration command value.

Next, calculation processing (second calculation processing) of the control command value (first control command value) by ACC (Gx_ACC) of step 202 is executed. When the leading vehicle is not supplemented, or when the leading vehicle is supplemented but is not in an ACC control range, requirement acceleration for running at a speed previously set by the driver is calculated, and is output as the control command value (Gx_ACC). Note that, in such a case, the control command value arithmetic unit 113 has a function equivalent to a constant-speed running function called CC, cruise control, and auto cruise. In addition, when the leading vehicle in the ACC control range is supplemented, a control command for maintaining an inter-vehicle distance (or inter-vehicle time) previously set by the driver and for performing follow-up running is calculated.

Next, by calculation processing of an arbitrated control command value of step 203, processing as illustrated in the following table 1 is executed in accordance with the control command value (Gx_Drv) calculated in step 201 described above and the control command value (Gx_ACC) calculated in step 202 described above. Then the arbitrated control command value (Gx_Arb) (first control command value) is calculated. As described above, the first control command value is a command value for controlling longitudinal acceleration of a vehicle, and is one of the control command value (Gx_Drv), the control command value (Gx_ACC), and the control command value (Gx_Arb).

Processing defined in this table is, in accordance with sequence described in a priority column, to determine whether each piece of input data satisfies described conditions, and to execute processing described for output data when all the conditions are satisfied. In addition, when a satisfied condition is found, determination of conditions thereafter is not executed. Here, a section described as "-" within the table represents that this section is not used for the determination of conditions.

TABLE 1

LOGICAL TABLE FOR CONTROL COMMAND
VALUE CORRECTION PROCESSING

| | INPUT DATA | | OUTPUT DATA |
|---|---|---|---|
| PRI-ORITY | CONTROL COMMAND VALUE ACCORDING TO DRIVER OPERATION (Gx_Drv) | CONTROL COMMAND VALUE BY ACC (Gx_ACC) | ARBITRATED CONTROL COMMAND VALUE (Gx_Arb) |
| 1 | ACCELERATION COMMAND (≥0) | ACCELERATION COMMAND (≥0) | SELECT HIGH PROCESSING |
| 2 | | DECELERATION COMMAND (<0) | DRIVER OPERATION PRIORITY PROCESSING |
| 3 | OTHER THAN ABOVE | — | DRIVER OPERATION PRIORITY PROCESSING |

Here, Gx_Drv: Control command value according to driver operation [G], Gx_ACC: Control command value by ACC [G], and Gx_Arb: Arbitrated control command value [G].

Note that, when the control command value calculated in the calculation processing of the control command value according to driver operation (Gx_Drv) of step 201 is an acceleration command (≥0), and when the control command value (on an acceleration side) calculated in the calculation processing of the control command value by ACC (Gx_ACC) of step 202 is an acceleration command (≥0), select high processing described in Table 1 is processing for selecting a larger value.

Also, when the control command value (Gx_Drv) calculated in the calculation processing of the control command value according to driver operation (Gx_Drv) of step 201 is an acceleration command (≥0), and when the control command value (on an acceleration side) calculated in the calculation processing of the control command value by ACC (Gx_ACC) of step 202 is a deceleration command (<0), driver operation priority processing is processing for outputting the control command value (Gx_Drv) according to driver operation as the arbitrated control command value (Gx_Arb).

Note that in the other case, that is, generally, when the driver performs brake operation (deceleration command), settings of the vehicle speed and the inter-vehicle distance (or inter-vehicle time) which are previously set by ACC are canceled, and the control command value by ACC (Gx_ACC) is not calculated but becomes zero, resulting in processing with priority given to the driver operation.

Next, calculation processing of the control command value by G-Vectoring control of step 204 is executed, and the GVC control command value (Gx_GVC) (second control command value) is calculated by Mathematical Formula 1 described below.

[Mathematical Formula 1]

$$G_{x\_GVC} = -\text{sgn}(Gy \cdot \dot{G}y)\frac{C_{xy}}{1+Ts}|\dot{G}y| \quad \text{※} \dot{G}y = Gy\_dot \quad (1)$$

Here, Gx_GVC: GVC control command value [G], Gy: Lateral acceleration of a vehicle [G], Gy_dot: Lateral jerk of a vehicle [G/s], Cxy: Control gain, T: Momentary delay time constant, and s: Laplace operator.

The GVC control command value (Gx_GVC), which is the second control command value, controls the longitudinal acceleration according to the lateral jerk that acts on a vehicle, and is calculated by the calculation processing unit of control command value by G-Vectoring control 113c, which is the second control command value arithmetic unit.

Note that in the present exemplary embodiment, as the lateral acceleration of a vehicle and the lateral jerk of a vehicle used in Mathematical Formula 1, information that is input from the vehicle motion information acquisition unit 112 is used. However, information estimated by a known vehicle model from the steering angle and the self-vehicle speed may be used.

Next, correction determination processing according to the control command value of step 205 is executed. A correction determination status (T_status) is calculated by processing illustrated in Table 2 below based on the arbitrated control command value (Gx_Arb) and the GVC control command value (Gx_GVC). Processing defined with reference to Table 2 below is as stated above.

TABLE 2

LOGICAL TABLE FOR CORRECTION
DETERMINATION PROCESSING ACCORDING
TO CONTROL COMMAND VALUE

| | INPUT DATA | | OUTPUT DATA |
|---|---|---|---|
| PRI-ORITY | ARBITRATED CONTROL COMMAND VALUE (Gx_Arb) | GVC CONTROL COMMAND VALUE (Gx_GVC) | CORRECTION DETERMINATION STATUS (T_status) |
| 1 | ≥m_GVC_TH | ≤m_GVC_DEC_TH | CORRECTION NEEDED (T_Corr) |
| 2 | OTHER THAN ABOVE | — | CORRECTION UNNEEDED (T_NotCorr) |

Here, T_status: Correction determination status, T_NotCorr: Value representing correction unneeded, T_Corr: Value representing correction needed, Gx_Arb: Arbitrated control command value [G], Gx_GVC: GVC control command value [G], m_GVC_TH: Threshold for determination that a control command sufficient for correction is output [G], and m_GVC_DEC_TH: Threshold for determination that GVC control command value is performed by correction [G].

As illustrated in Table 2, when the arbitrated control command value (Gx_Arb) calculated in step 203 is equal to or greater than the threshold for determination that the control command sufficient for correction is output (m_GVC_TH), and when the GVC control command value (Gx_GVC) calculated in step 205 is equal to or less than the threshold for determination that the GVC control command value is performed by correction (m_GVC_DEC_TH), the correction determination status (T_status) is determined that correction is needed (T_Corr).

In the other case, the correction determination status (T_status) is determined that correction is unneeded (T_NotCorr).

Here, it is important to set an appropriate value in a range of the GVC control command value to the threshold for determination that the control command sufficient for correction is output (m_GVC_TH). It is assumed that the threshold is set in a range from 0 to 0.3 [G].

Note that it is necessary to determine the threshold for determination that the control command sufficient for correction is output (m_GVC_TH) in consideration of a system used for the braking-driving unit 115 mounted on a vehicle. That is, when an acceleration control command value and a deceleration control command value may be continuously controlled like an electric motor system, it is possible to set a value of the threshold to a smaller value or a negative value. In contrast, when an engine system is used, since the acceleration control command value may be mainly controlled, it is preferable to set the threshold to a positive value with a certain magnitude. In a case of a system that combines the electric motor with the engine system, it is preferable to change the threshold for each driving mode, such as a mode of using only the electric motor, a mode of using only the engine, and combination of the electric motor and the engine.

Also, although the present exemplary embodiment has made a description using the arbitrated control command value (Gx_Arb) as the first control command value, the control command value according to driver operation (Gx_Drv) and the control command value by ACC (Gx_ACC) may be used. In this case, Table 1 is not used.

Next, control command value correction processing of step 206 is executed. In accordance with the correction determination status (T_status) calculated in step 205, processing for determining a corrected braking-driving control command value (Gx_Accel) and a corrected braking control command value (Gx_Decel) is performed, as illustrated in Table 3 below. Processing defined using this table is as stated above.

TABLE 3

LOGICAL TABLE FOR CONTROL COMMAND VALUE CORRECTION PROCESSING PRIORITY

| | | INPUT DATA | OUTPUT DATA |
|---|---|---|---|
| PRI-ORITY | CORRECTION DETERMINA-TION STATUS (T_status) | CORRECTED BRAKING-DRIVING CONTROL COMMAND VALUE (Gx_Accel) | CORRECTED BRAKING CONTROL COMMAND VALUE (Gx_Decel) |
| 1 | CORRECTION NEEDED (T_Corr) | Gx_Arb + Gx_GVC | 0 |
| 2 | OTHER THAN ABOVE | SELECT HIGH PROCESSING | SELECT LOW PROCESSING |

Here, T_status: Correction determination status, Gx_Accel: Corrected braking-driving control command value [G], Gx_Decel: Corrected braking control command value [G], T_Corr: Value representing correction needed, Gx_GVC: GVC control command value [G], and Gx_Arb: Arbitrated control command value [G].

When the correction determination status (T_status) is that correction is needed (T_Corr), the arbitrated control command value (Gx_Arb), which is the first control command value, is corrected based on the GVC control command value (Gx_GVC), which is the second control command value. Specifically, as the corrected braking-driving command value (Gx_Accel), a value obtained by adding the GVC control command value (Gx_GVC) to the arbitrated control command value (Gx_Arb) is output. Also, the corrected braking control command value (Gx_Decel) is zero.

When the correction determination status (T_status) is other than correction needed (T_Corr), the corrected braking-driving command value (Gx_Accel) is processing for selecting a larger value (select high processing) from among the control command value on an acceleration side, that is, the control command value with a positive value, from the control command value calculated in the calculation processing of the arbitrated control command value (Gx_Arb) of step 203, and the control command value calculated in the calculation processing of the control command value by G-Vectoring control (Gx_GVC) of step 204.

Also, the corrected braking control command value (Gx_Decel) is processing for selecting a smaller value (select low processing) from among the control command value on a deceleration side, that is, the control command value with a negative value, from the control command value calculated in the calculation processing of the arbitrated control command value (Gx_Arb) of step 203, and the control command value calculated in the calculation processing of the control command value by G-Vectoring control (Gx_GVC) of step 204.

Note that it is also possible to perform processing of step 205 to step 206 together as one logical table, and even in this case, an effect of the present invention is identical.

Next, braking-driving command filter processing of step 207 is executed, and by Mathematical Formula 2 below, a braking-driving control command output value (Gx_Accel_Out) is calculated from a braking-driving control command output value preceding value (Gx_Accel_Out_Z1) and the corrected braking-driving control command value (Gx_Accel).

[Mathematical Formula 2]

$$Gx\_Accel\_Out = \frac{T_0}{Ta} \cdot Gx\_Accel + \left(1 - \frac{T_0}{Ta}\right) \cdot Gx\_Accel\_Out\_Z1 \quad (2)$$

Here, Gx_Accel_Out: Braking-driving control command output value [G], Gx_Accel: Corrected braking-driving control command value [G], Gx_Accel_Out_Z1: braking-driving control command output value preceding value [G], T0: Sampling time [sec], and Ta: braking-driving output filter time constant [sec].

Also, when the control command value correction processing unit 113e executes correction as described above, this may also be informed to the driver by using the display unit 117.

Next, braking command filter processing of step 208 is executed, and by Mathematical Formula 3 below, a braking control command output value (Gx_Decel_Out) is calculated from a braking control command output value preceding value (Gx_Decel_Out_Z1) and the corrected braking control command value (Gx_Decel).

[Mathematical Formula 3]

$$Gx\_Decel\_Out = \frac{T_0}{Tb} \cdot Gx\_Decel + \left(1 - \frac{T_0}{Tb}\right) \cdot Gx\_Decel\_Out\_Z1 \quad (3)$$

Here, Gx_Decel_Out: Braking control command output value [G], Gx_Decel: Corrected braking control command value [G], Gx_Decel_Out_Z1: Braking control command output value preceding value [G], T0: Sampling time [sec], and Tb: Braking output filter time constant [sec].

Here, although the present exemplary embodiment uses low pass filter processing with a primary IIR (Infinite Impulse Response) filter as the filter processing, this is intended to prevent the control command value output value from changing suddenly when the corrected control command value is switched. Even if another filter processing is used, the essential effect of the present invention does not change.

<Example of a Specific Running Scene>

Figure 4:
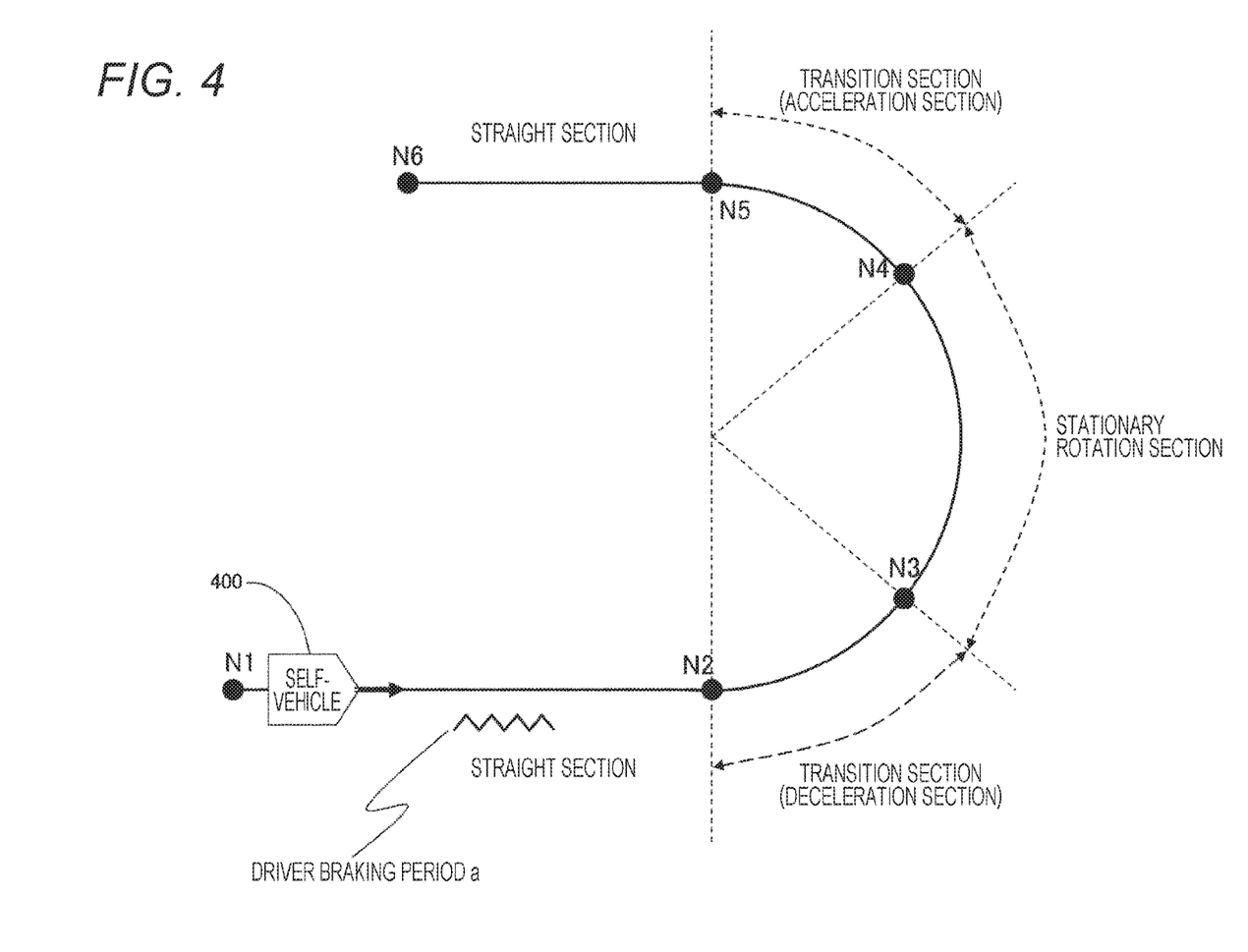
FIG. 4 is a diagram schematically illustrating a running route along which a vehicle enters and exits a curve.

FIG. 4 is a diagram schematically illustrating a running route along which the self-vehicle carrying the vehicle running control apparatus according to the present exemplary embodiment enters a curve until the self-vehicle exits the curve. The running route in this diagram includes a straight section (N1 to N2), a transition section made of an easement curve (N2 to N3), a stationary rotation section (N3 to N4), a transition section made of an easement curve (N4 to N5), and a straight section (N5 to N6).

The description below is premised on the following running scenario 1. First, the driver decelerates the self-vehicle in the straight section (N1 to N2) by brake operation until the driver subjectively feels sufficient (driver brake period a). Then, the driver enters the transition section (N2 to N3) while accelerating the self-vehicle gradually by accelerator operation. Subsequently, the driver passes through the stationary rotation section (N3 to N4) while maintaining almost constant accelerator operation. When entering the transition section (N4 to N5), the driver presses down on the accelerator gradually, and further presses down on the accelerator in the straight section (N5 to N6), to accelerate the self-vehicle to a target speed.

Figure 5:
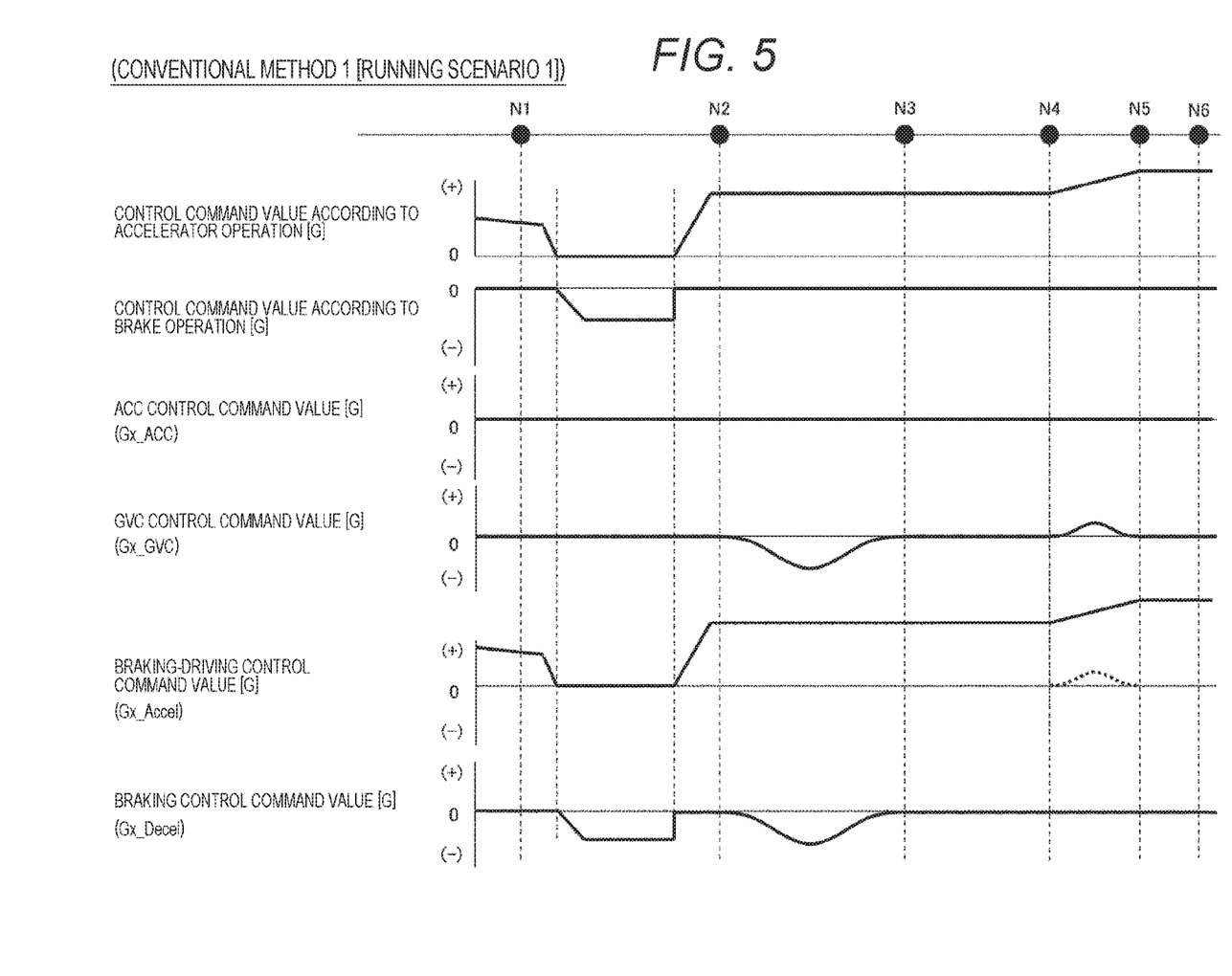
FIG. 5 is a diagram illustrating an example of a control command according to conventional technique 1 in running scenario 1.

First, with reference to FIG. 5, the following describes operation of the self-vehicle when the self-vehicle runs under the already described running scenario 1 by using the vehicle running control apparatus according to conventional technique 1. FIG. 5 illustrates, sequentially from top, time-series waveforms of the control command value according to driver accelerator operation, the control command value according to driver brake operation, the ACC control command value, the GVC control command value, the braking-driving control command value, and the braking control command value.

[Section (N1 to N2 to N3)]

In the first straight section (N1 to N2), under the aforementioned scenario, the driver first decelerates the self-vehicle by brake operation, and subsequently enters the transition section while accelerating the vehicle gradually by accelerator operation. At this time, the driver keeps the steering angle constant in order to cause the self-vehicle to travel in a straight line. Accordingly, lateral acceleration that acts on the self-vehicle becomes constant near zero, and thus the GVC command value becomes zero.

At this time, the deceleration control command calculated according to the brake operation is transmitted to the braking unit, and the self-vehicle decelerates. Next, the acceleration control command calculated according to the accelerator operation is transmitted to the braking-driving unit, and the self-vehicle accelerates.

Next, when the self-vehicle enters the transition section (N2 to N3), the driver runs while continuously keeping constant accelerator operation. In addition, at this time, the driver starts steering operation gradually, and starts to turn the steering wheel increasingly. In response to the steering operation by the driver, the lateral acceleration that acts on the self-vehicle also increases gradually. Then, the lateral jerk also increases, and thus the deceleration control command value by the GVC control command value is calculated.

At this time, the acceleration control command calculated according to the accelerator operation is transmitted to the braking-driving unit, and the self-vehicle runs while maintaining acceleration or a constant speed. At the same time, the deceleration command by GVC is transmitted to the braking unit, and the self-vehicle decelerates. That is, in this section, acceleration by the braking-driving unit and deceleration by the braking unit act on the vehicle simultaneously.

Thus, conventional technique 1 allows stabilization of the vehicle by applying a longitudinal control command value calculated according to the lateral jerk that acts on the vehicle. However, a strong uncomfortable feeling occurs by application of brake control although the driver is performing the accelerator operation.

Figure 6:
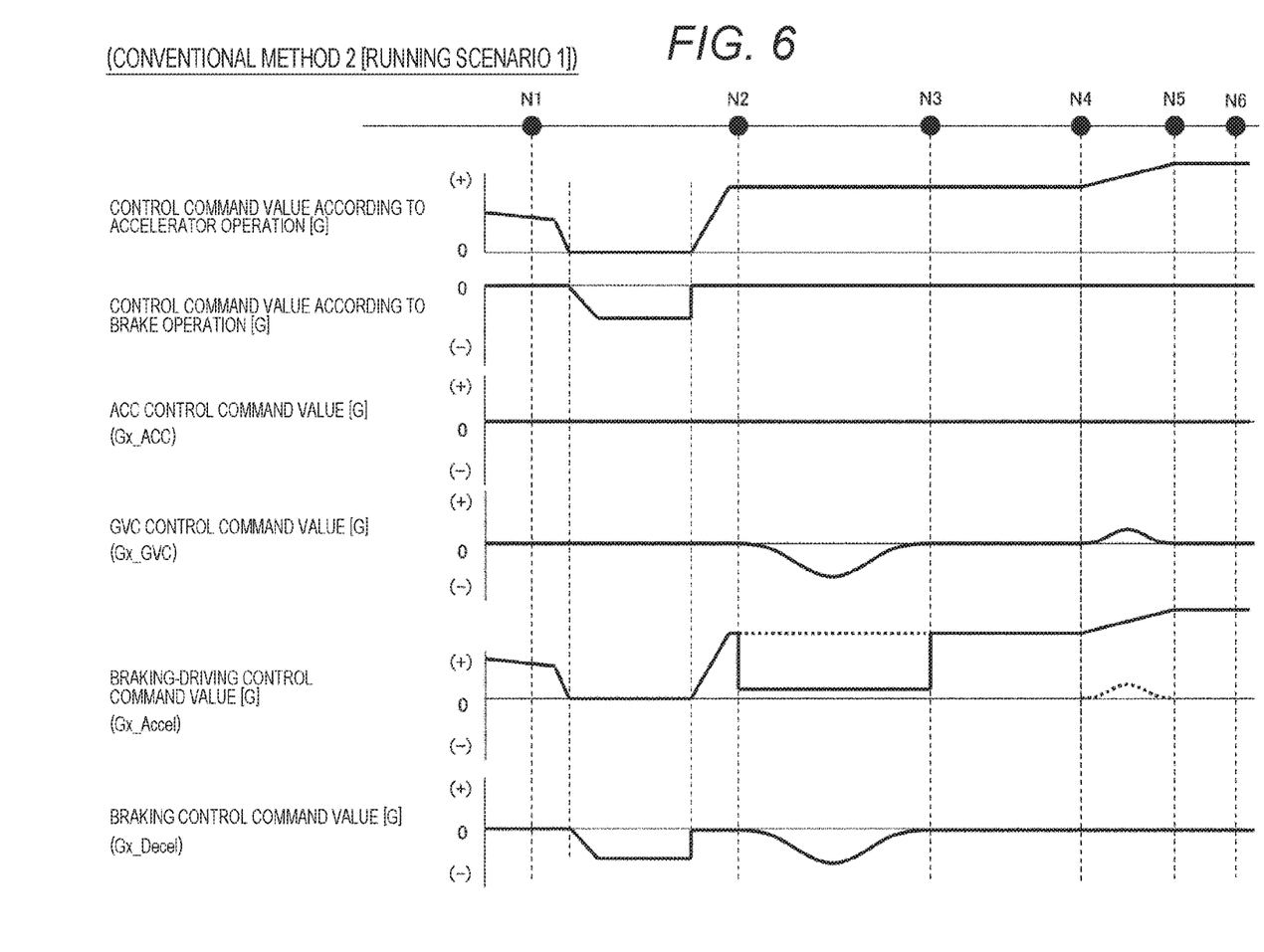
FIG. 6 is a diagram illustrating an example of the control command according to conventional technique 2 in running scenario 1.

In addition, with reference to FIG. 6, the following describes operation of the self-vehicle when the self-vehicle runs under the already described running scenario 1 by using the vehicle running control apparatus according to conventional technique 2 different from conventional technique 1 of FIG. 5. Like this conventional technique 2, there is a method for inhibiting the acceleration control command to a certain level and giving priority to braking, when there is a deceleration control command. In this case, however, although the driver steps on the accelerator, only deceleration is applied, which causes a strong uncomfortable feeling.

Therefore, a method is desired for correcting the control command value in accordance with the control command value while the driver performs accelerator operation to avoid giving an uncomfortable feeling to the driver.

[Section (N3 to N4)]

Subsequently, when the self-vehicle enters the stationary section (N3 to N4), the driver runs while continuously keeping the constant accelerator operation. Also, the driver stops turning the steering wheel and keeps a constant steering angle. At this time, the lateral acceleration that acts on the self-vehicle becomes constant, the lateral jerk also becomes zero, and thus the GVC control command value becomes zero.

Accordingly, the acceleration control command calculated in accordance with the accelerator operation is transmitted to the braking-driving unit, and the self-vehicle runs while maintaining acceleration or a constant speed.

[Section (N4 to N5 to N6)]

Subsequently, when the self-vehicle enters the transition section (N4 to N5), the driver further accelerates the vehicle by the accelerator operation and then enters the straight section while keeping the acceleration. Also, the driver starts to turn the steering wheel back. In accordance with this driver operation, the lateral acceleration that acts on the self-vehicle decreases gradually. Thus, since the lateral jerk decreases, the acceleration control command value is calculated as the GVC control command value.

At this time, after a larger value is selected from among the acceleration control command value calculated in accordance with the accelerator operation by the driver and the acceleration control command value by GVC, the selected value is transmitted to the braking-driving unit, and the self-vehicle runs while maintaining acceleration or a constant speed.

Subsequently, when the self-vehicle enters the straight section (N5 to N6), the self-vehicle accelerates to a speed desired by the driver by the accelerator operation. In addition, the driver stops the steering operation, and in order to maintain that the vehicle travels in a straight line, the driver keeps the steering angle constant. Accordingly, the lateral acceleration that acts on the self-vehicle becomes constant, and thus the GVC control command value returns to zero again.

Figure 7:
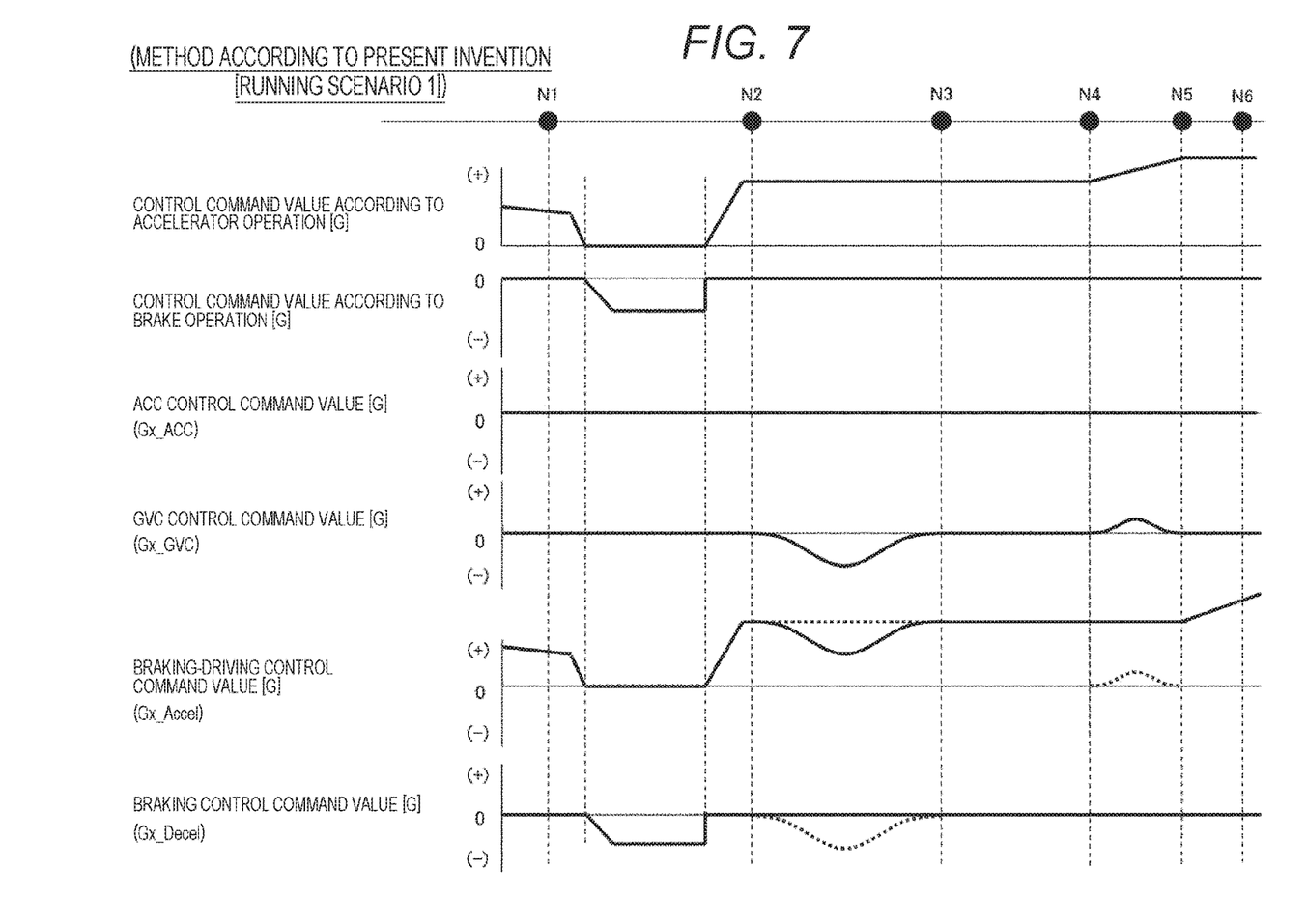
FIG. 7 is a diagram illustrating an example of the control command in the vehicle running control apparatus according to the present invention in running scenario 1.

Next, with reference to FIG. 7, the following describes operation of the self-vehicle when the self-vehicle runs under the already described running scenario 1 by using the vehicle running control apparatus according to the present exemplary embodiment. Here, the running route after N3 does not become a problem even in the conventional technique as described above, and thus description thereof will be omitted.

FIG. 7 illustrates, sequentially from top, time-series waveforms of the control command value according to driver accelerator operation, the control command value according to driver brake operation, the ACC control command value, the GVC control command value, the braking-driving control command value, and the braking control command value.

[Section (N1 to N2 to N3)]

As described above, since the GVC command value becomes zero in the first straight section (N1 to N2), in a similar manner to the aforementioned conventional technique, the vehicle undergoes acceleration control and deceleration control in accordance with the accelerator operation and brake operation by the driver.

Next, when the self-vehicle enters the transition section (N2 to N3), the driver runs while continuously keeping constant accelerator operation. In addition, at this time, the driver starts steering operation gradually, and starts to turn the steering wheel increasingly. In response to the steering operation by the driver, the lateral acceleration that acts on the self-vehicle also increases gradually. Then, the lateral jerk also increases, and thus the deceleration control command value by the GVC control command value is calculated.

At this time, as described above, according to the conventional technique, a strong uncomfortable feeling occurs by application of brake control although the driver is performing the accelerator operation.

Therefore, according to the exemplary embodiment of the present invention, by the process of step 200 through step 208, when the control command value (Gx_Arb) is equal to or greater than a certain value, by applying to a vehicle the corrected control command value (Gx_Corr) obtained by adding the deceleration control command value by GVC (Gx_GVC) to the acceleration control command value (Gx_Arb) as illustrated in FIG. 7, it becomes possible to achieve an effect of stabilizing the vehicle by relative deceleration instead of absolute deceleration by braking, while reducing (or canceling) the uncomfortable feeling of the driver caused by application of brake during the accelerator operation.

Figure 8:
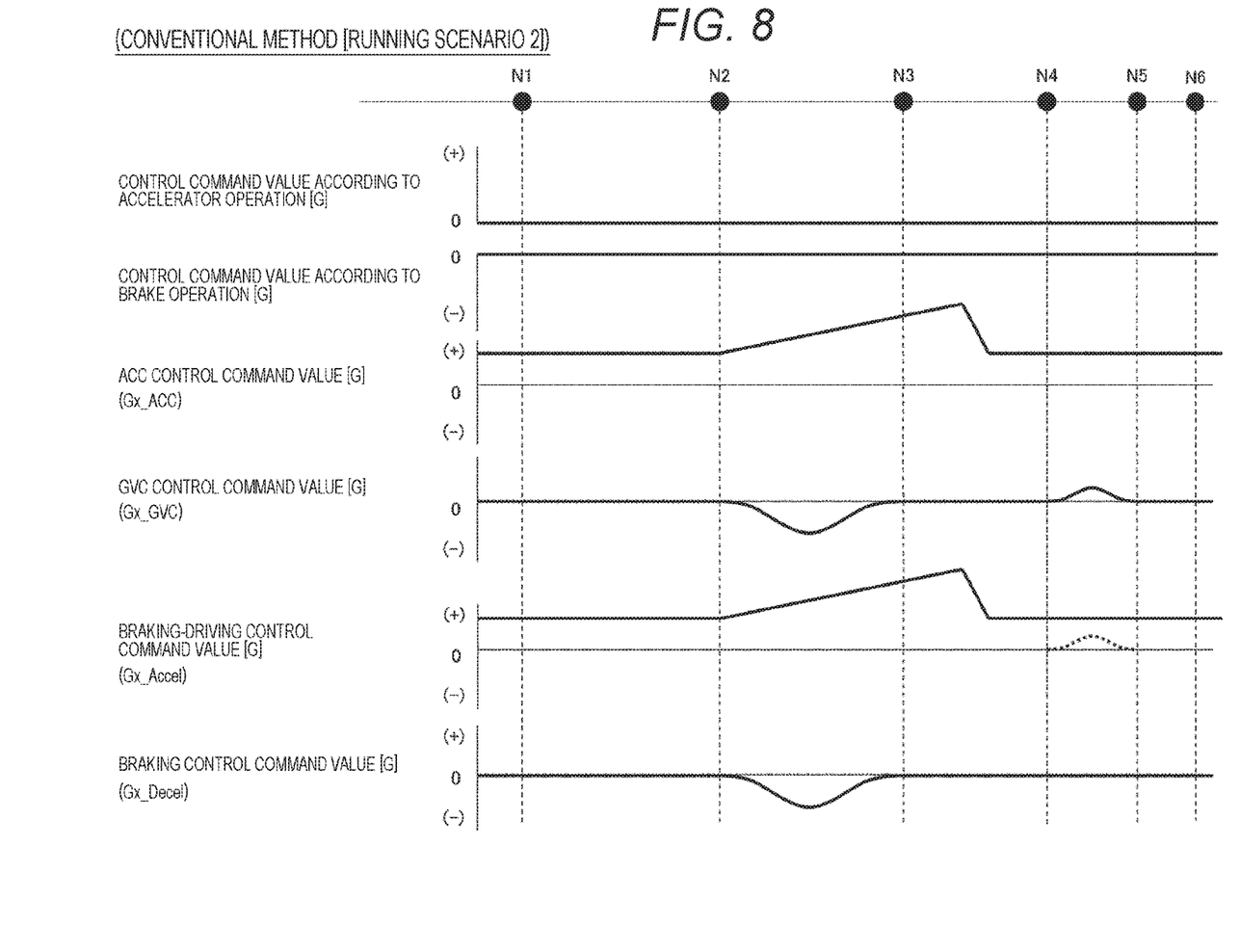
FIG. 8 is a diagram illustrating an example of the control command according to the conventional technique in running scenario 2.

Next, with reference to FIG. 8, the following describes a case where the self-vehicle runs the running route as illustrated in FIG. 5 by using the vehicle running control apparatus according to the conventional technique under running scenario 2 different from already described running scenario 1.

As running scenario 2, the following describes a case where the driver runs at a speed previously set by ACC. At this time, the driver does not perform accelerator operation or brake operation.

FIG. 8 illustrates, sequentially from top, time-series waveforms of the control command value according to driver accelerator operation, the control command value according to driver brake operation, the ACC control command value, the GVC control command value, the braking-driving control command value, and the braking control command value.

[Section (N1 to N2 to N3)]

In the first straight section (N1 to N2), the control command value for maintaining a constant speed by ACC is calculated. At this time, the driver keeps the steering angle constant in order to cause the self-vehicle to travel in a straight line. Accordingly, the lateral acceleration that acts on the self-vehicle becomes constant near zero, and thus the GVC command value becomes zero.

Therefore, at this time, the acceleration control command value calculated by ACC is transmitted to the braking-driving unit, and the self-vehicle runs at a constant speed.

Next, when the self-vehicle enters the transition section (N2 to N3), the self-vehicle speed is reduced gradually by running resistance and the like, and thus the acceleration control command value is calculated by ACC so that the self-vehicle speed may become a setting speed. In addition, at this time, the driver starts steering operation gradually, and starts to turn the steering wheel increasingly. In response to the steering operation by the driver, the lateral acceleration that acts on the self-vehicle also increases gradually. Then, the lateral jerk also increases, and thus the deceleration control command value by the GVC control command value is calculated.

At this time, the acceleration control command calculated by ACC is transmitted to the braking-driving unit, and the self-vehicle attempts to run while accelerating and maintaining a constant speed. At the same time, the deceleration command value by GVC is also transmitted to the braking unit, and the self-vehicle decelerates. That is, in this section, acceleration by the braking-driving unit 115 and deceleration by the braking unit 114 act on the vehicle simultaneously.

Thus, the conventional technique allows stabilization of the vehicle by applying the longitudinal control command value calculated in accordance with the lateral jerk that acts on the vehicle. However, a strong uncomfortable feeling occurs by application of brake control although acceleration control by ACC is being applied.

Therefore, a method is desired, when there is an acceleration control command for the vehicle, for correcting the control command value in accordance with the control command value to avoid giving an uncomfortable feeling to the driver.

[Section (N3 to N4)]

Subsequently, although the self-vehicle enters the stationary section (N3 to N4), ACC calculates the control command that returns the lowered vehicle speed to the setting vehicle speed. At this time, the lateral acceleration that acts on the self-vehicle becomes constant, the lateral jerk also becomes zero, and thus the GVC control command value becomes zero.

Accordingly, the acceleration control command calculated by ACC is transmitted to the braking-driving unit, and the self-vehicle runs while being controlled to accelerate and return to the setting vehicle speed.

[Section (N4 to N5 to N6)]

Subsequently, when the self-vehicle enters the transition section (N4 to N5), the control command that returns the lowered vehicle speed to the setting vehicle speed is calculated similarly. Also, the driver starts to turn the steering wheel back. In accordance with this driver operation, the lateral acceleration that acts on the self-vehicle decreases gradually. Thus, since the lateral jerk decreases, the acceleration control command value is calculated as the GVC control command value.

At this time, after a larger value is selected from among the acceleration control command value calculated in accordance with the driver accelerator operation and the acceleration control command value by GVC, the selected value is transmitted to the braking-driving unit, and the vehicle is controlled and runs to accelerate and return to the setting vehicle speed.

Subsequently, when the self-vehicle enters the straight section (N5 to N6), the control command that returns the lowered vehicle speed to the setting vehicle speed is calculated similarly. In addition, the driver stops the steering operation, and in order to maintain that the vehicle travels in a straight line, the driver keeps the steering angle constant. Accordingly, the lateral acceleration that acts on the self-vehicle becomes constant, and thus the GVC control command value returns to zero again.

Figure 9:
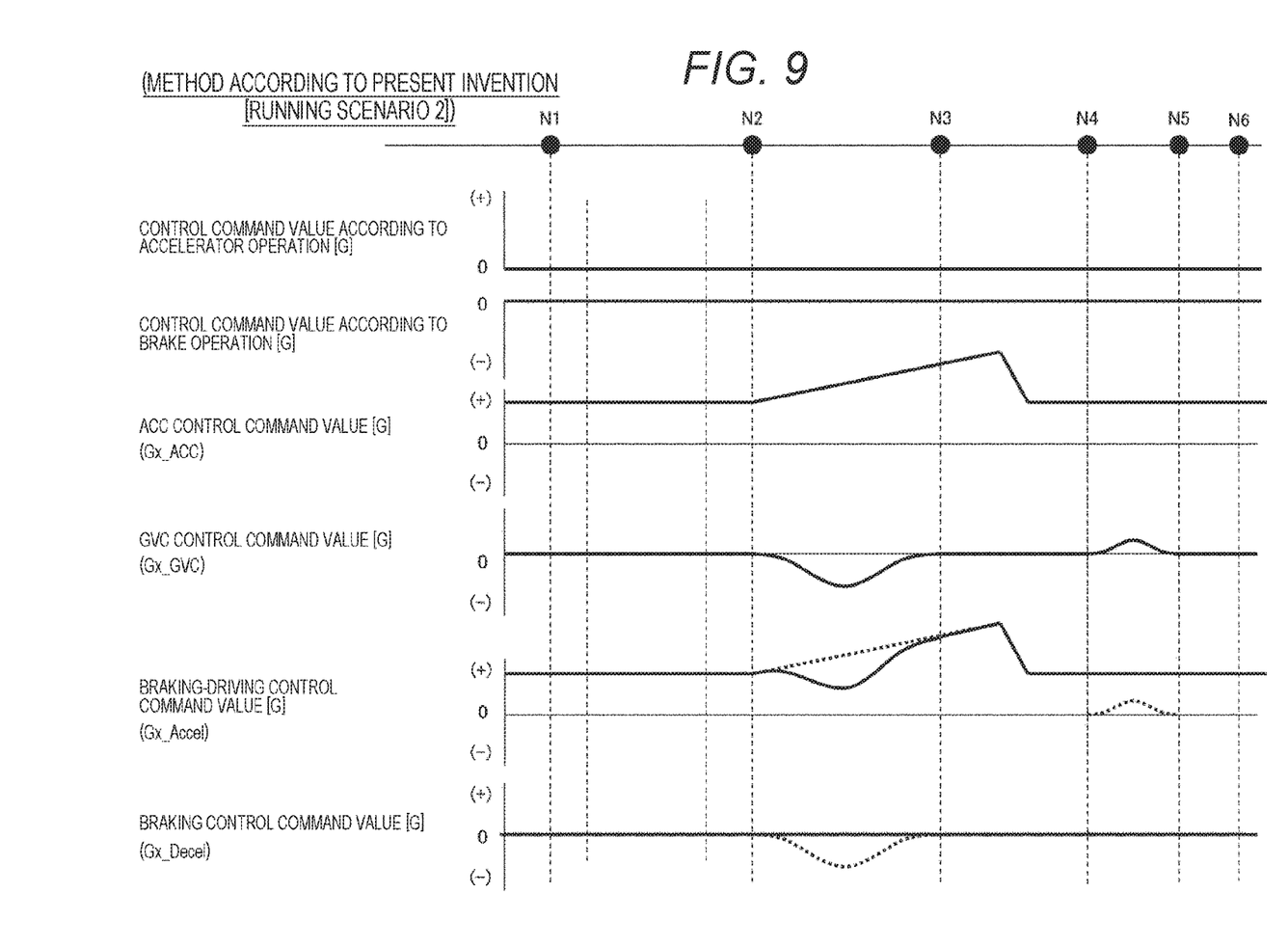
FIG. 9 is a diagram illustrating an example of the control command in the vehicle running control apparatus according to the present invention in running scenario 2.

Next, with reference to FIG. 9, the following describes operation of the self-vehicle when the self-vehicle runs under the already described running scenario 2 by using the vehicle running control apparatus according to the present exemplary embodiment. Here, the running route after N3 does not become a problem even in the conventional technique as described above, and thus description thereof will be omitted.

FIG. 9 illustrates, sequentially from top, time-series waveforms of the control command value according to driver accelerator operation, the control command value according to driver brake operation, the ACC control command value, the GVC control command value, the braking-driving control command value, and the braking control command value.

[Section (N1 to N2 to N3)]

As described above, since the GVC command value becomes zero in the first straight section (N1 to N2), the vehicle is controlled by ACC in a similar manner to the aforementioned conventional technique.

Next, when the self-vehicle enters the transition section (N2 to N3), the self-vehicle speed is reduced gradually by running resistance and the like, and thus the acceleration control command value is calculated by ACC so that the self-vehicle speed may become a setting speed. In addition, at this time, the driver starts steering operation gradually, and starts to turn the steering wheel increasingly. In response to the steering operation by the driver, the lateral acceleration that acts on the self-vehicle also increases gradually. Then, the lateral jerk also increases, and thus the deceleration control command value by the GVC control command value is calculated.

At this time, as described above, according to the conventional technique, a strong uncomfortable feeling occurs by application of brake control although acceleration control by ACC is being applied.

Therefore, according to the exemplary embodiment of the present invention, by the process of step 200 through step 208, when the control command value (Gx_Arb) is equal to or greater than a certain value, by applying to a vehicle the corrected control command value (Gx_Corr) obtained by adding the deceleration control command value by GVC (Gx_GVC) to the acceleration control command value (Gx_Arb) as illustrated in FIG. 9, it becomes possible to achieve an effect of stabilizing the vehicle by relative deceleration instead of absolute deceleration by braking, while reducing (or canceling) the uncomfortable feeling of the driver caused by application of brake to acceleration operation.

As described above, the exemplary embodiment of the present invention may provide the vehicle running control apparatus capable of comfortably controlling a vehicle while inhibiting an uncomfortable feeling of a driver by applying to the vehicle longitudinal acceleration according to the lateral jerk that acts on the vehicle in consideration of dimensions of longitudinal acceleration requirements for the vehicle.

In the above description, the running control algorithm mounted on the control command value arithmetic unit 113 is calculation processing of the control command value according to the driver operation, ACC, and G-Vectoring control. However, even if another running control algorithm that uses longitudinal acceleration as a control command is added to or replaces the control command value calculation processing unit 113b, similar effects may be obtained.

Although the exemplary embodiment of the present invention has been described in detail above with reference to the drawings, the specific configuration is not limited to the aforementioned exemplary embodiment. Even if design changes and the like are made without departing from the spirit of the present invention, those are included in the present invention. For example, the aforementioned exemplary embodiment is described in detail in order to describe the present invention plainly, and is not necessarily limited to the exemplary embodiment that includes all the described elements. Also, it is possible to replace part of elements of an exemplary embodiment with elements of another exemplary embodiment, and it is also possible to add elements of an exemplary embodiment to elements of another exemplary embodiment. Also, it is possible to perform addition, deletion, and replacement of part of elements of each exemplary embodiment with other elements.

Specifically, although the G-Vectoring control is cited and described as the illustrated running control algorithm, in addition to the G-Vectoring control, the running control algorithm may be Adaptive Cruise Control (ACC) and pre-crash control. Moreover, a running control algorithm that combines these two or more control methods may also be used.

Also, part or all of the aforementioned elements, functions, processing units, and the like may be implemented by hardware, for example, through design with integrated circuits. Also, each of the aforementioned elements, functions, and the like may be implemented by software, by a processor interpreting and executing a program that implements each function. Information such as a program, table, and file that implements each function may be placed in a recording device, such as a memory, hard disk, and Solid State Drive (SSD), or in a recording medium, such as an IC card, SD card, and DVD.

REFERENCE SIGNS LIST 100 vehicle running control apparatus
111 driver operation information acquisition unit
112 vehicle motion information acquisition unit
113 control command value arithmetic unit
114 braking unit
115 braking-driving unit
116 external world recognition information acquisition unit
117 display unit

The invention claimed is:

1. A vehicle running control system comprising:
a central processing unit disposed hi a vehicle; and
a decelerator;
a memory,
wherein the central processing unit
calculates a first control command value that controls vehicle longitudinal
acceleration;
calculates a second control command value that controls longitudinal acceleration based on measured amount of lateral jerk that acts on the vehicle;

determines whether to make correction based on the first control command value and the second control command value;

when the first control command value is equal to or greater than a threshold vale, the central processing unit applies to the vehicle a corrected control command value that is obtained by subtracting a deceleration control command value of the vehicle from the first control command value, to thereby stabilize the vehicle via relative deceleration instead of via absolute deceleration by the decelerator calculates requirement acceleration for miming at a vehicle speed previously set by a driver, and outputs the requirement acceleration as the first control command value, calculates requirement acceleration for maintaining an inter-vehicle distance between a self-vehicle and a leading vehicle at an inter-vehicle distance previously set by the driver to perform follow-up running, when the leading vehicle is detected; and the central processing unit comprises:

first calculation processing for calculating a control command value according to driver accelerator operation;

second calculation processing for calculating a control command value for running at a vehicle speed previously set by the driver; and third calculation processing for calculating an arbitrated control calculation processing.

2. The vehicle running control system according to claim 1, wherein, when the central processing unit determines that correction is unneeded, the central processing unit outputs the first control command value or the second control command value.

3. The vehicle running control system according to claim 1, wherein the central processing unit calculates requirement acceleration according to driver accelerator operation, and outputs the requirement acceleration as the first control command value.

4. The vehicle running control system according to claim 1, wherein, when the first control command value is equal to or greater than a previously determined first threshold, and when the second control command value is equal to or less than a previously determined second threshold, the central processing unit determines that correction is possible.

5. The vehicle running control system according to claim 1, wherein, when the central processing unit determines that correction is needed, the central processing unit outputs a value obtained by subtracting the second control command value from the first control command value.

6. The vehicle running control system according to claim 1, wherein, when the control command value calculated in the first calculation processing is an acceleration command value, and when the control command value calculated in the second calculation processing is an acceleration command value, the central processing unit outputs the control command value with a larger value as the arbitrated control command value.

7. The vehicle running control system according to claim 1, wherein, when the control command value calculated in the first calculation processing is an acceleration command value, and when the control command value calculated in the second calculation processing is a deceleration command value, the central processing unit outputs the control command value calculated in the first calculation processing as the arbitrated control command value.

8. The vehicle running control system according to claim 1, wherein the leading vehicle is detected by at least one external world recognition sensor of a monocular camera, a stereoscopic camera, a millimeter-wave radar, and a laser radar.

9. The vehicle running control system according to claim 1, wherein, when the central processing unit executes correction, a display informs a driver.

\* \* \* \* \*